Patented Dec. 11, 1923.

1,477,394

UNITED STATES PATENT OFFICE.

HARRY S. THATCHER, OF LOS ANGELES, CALIFORNIA, ASSIGNOR TO THE CELITE COMPANY, OF LOS ANGELES, CALIFORNIA, A CORPORATION OF DELAWARE.

ART OF FILTRATION.

No Drawing.   Application filed August 6, 1923.   Serial No. 656,112.

*To all whom it may concern:*

Be it known that I, HARRY S. THATCHER, a citizen of the United States, residing at Los Angeles, in the county of Los Angeles and State of California, have invented a new and useful Improvement in the Art of Filtration, of which the following is a specification.

This invention relates to the filtration of various liquids, such as sugar solutions, fruit juices, oils, sewage or other liquids containing suspended matter and of such nature as to be difficult to filter. In filtering such liquids it has been found desirable to employ a so-called "filter-aid" to accelerate and improve the filtering operation, the material used for this purpose being the porous siliceous material known under various names as diatomaceous earth, infusorial earth, diatomite, kieselguhr, fossil flour, or tripoli. The material referred to is generally used by adding it in the form of powder or finely divided condition to the solution to be filtered, the mixture being generally agitated and sometimes heated and being then subjected to filtering operation in a filter-press. The diatomaceous earth, constituting the filter-aid, is retained on the filter cloth with the solids which it is desired to remove from the liquid being treated, and acts to accelerate and improve the filtration by reason of its porous and adsorptive qualities.

The main object of the present invention is to improve such filtering operations by using a diatomaceous earth product which is more effective in filtration than the ordinary powdered and dried diatomaceous earth. For this purpose I employ as a filter-aid a product which is made by calcining powdered or finely divided diatomaceous earth at such a temperature as to increase its efficiency as a filter-aid. I have found that the efficiency of diatomaceous earth, as an aid in filtration and adsorption, can be greatly increased by calcining at very high temperatures, in such manner as to change, to some extent, the physical and chemical constitution of the diatomaceous earth and remove or render harmless certain constituents of ordinary diatomaceous earth which tend to interfere with or retard the filtering operation. My improved filter-aid may be prepared in the following manner: Diatomaceous earth in the condition in which it has been customary to use it as a filter-aid, that is to say, in powdered or finely divided condition (for example finer than 100 mesh) is calcined in any suitable type of furnace at such temperature and for sufficient time to increase the filtering and adsorptive properties thereof. I have obtained good results by calcining the powdered diatomaceous earth at a temperature of about 1800° F. for about fifteen minutes. In any case, the temperature should be in excess of 1200° F. and should not be above a temperature (say 2500° F.) at which any considerable sintering or binding action in the mass of finely divided diatomaceous earth takes place, and the duration of heating will depend on the temperature used, a longer period of heating being required when the temperature is lower than 1800° F.

The diatomaceous earth used in making the filter-aid is the prepared material which is now in use as an aid in filtration operations, and consists of diatomaceous earth of a rather high degree of purity, which has been prepared for such use by grinding, pulverizing or disintegrating it to a state of fine division, preferably to such degree of fineness that at least 90 per cent will pass through a 200 mesh screen. The fineness of division may vary according to circumstances, but in any case it should be fine enough to enable it to act as a filter-aid, the purpose and effect of the calcining operation being to increase the effectiveness and capacity of the material in that respect.

I have used satisfactorily, as a material for making the filter-aid a diatomaceous earth from California deposits having, aside from any moisture content, approximately the following composition:

| | |
|---|---:|
| $SiO_2$ | 89.10 |
| $Al_2O_3$ | 4.00 |
| Soluble $SiO_2$ | 0.20 |
| $Fe_2O_3$ | .70 |
| CaO | .40 |
| MgO | .40 |
| Organic matter | .20 |
| Combined $H_2O$ | 5.00 |
| | 100.00 |

If the alumina is figured as being contained as clay, the percentage of clay would be 10 per cent.

The calcination may be effected in any suitable type of furnace. I have obtained good results by using an oil burning muffle furnace, but a rotary kiln or other type of furnace may be used.

The material produced by calcination as above described is liable to contain aggregates or nodules due to a slight sintering or adhering together of some of the particles of the finely ground diatomaceous earth, and as it is generally necessary that the material when used as a filter-aid should all be in a finely divided condition it is generally desirable to again subject the calcined material to a reducing, milling, or disintegrating operation. As the aggregates above referred to are generally rather friable or weakly held together, the disintegration thereof can be effected by a beating or agitating action and is preferably effected by means of a fan acting as a disintegrator. For this purpose the calcined material discharged from the furnace may be drawn through a suitable conduit by means of a current of air produced in such conduit by action of a suction fan, disintegration of the material being effected by the beating action of the fan and impact of the material on the fan parts, the fan rotating at a sufficiently high velocity to effect the desired disintegration. The operation of the current of air serves to convey the material to any desired place for packing, storage, or use and to cool the material. It is important in this connection that the material be cooled (for example by contact with such current of air) before it reaches the fan so as to prevent injury to the fan by overheating and to ensure against any tendency to reaggregation.

The pulverized diatomaceous earth, calcined as above described, is used in the filtration operation by adding it to the solution or mixture to be filtered, agitating and heating, if necessary, and then filtering in a filter-press or other suitable filtering apparatus. I have found that when the calcining operation has been properly carried out, the efficiency of the diatomaceous earth as a filter-aid is greatly increased by such calcination.

As an example of the effect of calcination, the following results are given:

105 pounds raw sugar, melted in 70 pounds of water at 80° C., and then mixed with .84 pound uncalcined diatomaceous earth, gave a flow, through a small pressure filter, of 48.7 pounds in 36 minutes; whereas, the same proportion of the same filter-aid previously calcined for 30 minutes at 1600° F., gave 124 pounds filtrate. The increased filtrate obtained was 154 per cent.

In explanation of the nature and effect of the change produced in diatomaceous earth by calcination, it may be stated that ordinary diatomaceous earth contains considerable quantities of clay and also generally contains appreciable quantities of so-called soluble silica and of iron compounds, and also, in some cases, organic matter in more or less minute quantities, and the calcination may act on any one or more of the substances so as to change the nature thereof, in such manner as to eliminate any injurious action they may exert on the filtering operation.

A typical diatomaceous earth contains about 89 per cent silica and 4 per cent of alumina, presumably combined as a hydrated silicate of aluminum or clay. Clay in water is slimy in nature. On a filter cloth it gives a more or less impervious layer which tends to slow down the rate of passage of liquid through it. By heating such a diatomaceous earth to temperature sufficient to "set" the clay, a marked improvement in the material results, in that liquids mixed with it will filter through a medium faster than through similar diatomaceous earth which has not been calcined. By setting of the clay I mean the dehydration and other changes which are produced in clay by strong heating. In general, the setting of the clay is not the only desirable change which is produced by the calcination. My process makes use of all the desirable changes which take place at the temperature used, and may be carried out in any manner and at any temperature of heating of the material, so as to increase the effectiveness of the material as a filter-aid.

In addition to clay, the calcined diatomaceous earth contains various other substances which are more or less inimical to effective filtration and which are liable to retard the flow of liquid in the filtering operation, such substances being generally either water soluble to some extent or more or less of a colloidal nature, so that they tend to clog the filter cake or mass of material which builds up on the filter cloth or medium; for example, the diatomaceous earth generally contains more or less iron in the form of oxide or hydrate or other iron compounds, and also contains a slight amount of so-called soluble silica and the heating or calcining operation above referred to also has the effect of rendering such compounds insoluble or of "setting" the same so as to render them harmless and thereby producing a material which is capable of effecting more rapid filtration. Various organic compounds may also be present in the diatomaceous earth, and the heating or calcining may have a beneficial effect in regard to such compounds, the effect of the heat or calcination being in any case to set or render substantially or relatively insoluble any water soluble, or acid soluble or colloidal material present in the diatomaceous earth. The heating may also effect the physical structure and density of the diatomaceous earth, so as to increase the effectiveness of the material as a filter-aid.

In so far as the diatomaceous earth may contain soluble silica (silica soluble in dilute hydrochloric acid), it is also benefited by the action of the heat on such soluble silica—the silica being made less soluble and less reactive in liquors to which it is added for filtration and other industrial purposes.

Diatomaceous earth is much used as a filter-aid, in the filtration of sugar liquors, vegetable oils, and fruit juices and these liquors or solutions dissolve some of the more easily soluble silica. As a result the ash content of the finished product may become undesirably high. Also, liquors, as in sugar refining, come to contain much silica (or silicic acid) which interferes with the recovery of sugar.

Silica which dissolves in commercial operations is of two kinds. The first dissolves in water or in acids, presumably as a colloidal silica or silicic acid. The second variety is that which does not dissolve in water or in acids but reacts with alkalies only to give soluble silicates.

My process destroys, or markedly diminishes, the tendency of silica to act in both these manners. By strongly calcining, I destroy whatever colloidal silica exists in native diatomaceous earth. This strong calcination also decreases the rate at which the silica will dissolve in alkalies, perhaps by partially sintering the finest of the silica particles, either alone, or in contact with the clay which occurs in such native material.

For some diatomaceous earths, such as those high in clay, it is best to heat to maximum temperatures of about 1800° F. With any earth it is possible to secure a satisfactory result with a temperature lower by several hundred degrees than the optimum stated or with a higher temperature almost but not quite to the point where the sintering action is sufficient to bind strongly or firmly together the particles of powder.

The calcination above described also has the effect of adding mechanical strength to the particles of diatomaceous earth and thereby aids in maintaining a more porous filter cake than can be maintained when using the ordinary commercial grades of powdered diatomaceous earth, which is of a comparatively soft and fluffy nature.

This process may be applied with advantage not only in the improvement of high grade diatomaceous earth, such as is now in successful use as a filter-aid, so as to largely increase its filtering capacity, but also in the treatment (by calcination) of inferior grades of milled or powdered diatomaceous earth, such as are not now considered suitable, for filter-aid purposes, in order to render such inferior material adaptable for use as filter-aid.

Diatomaceous earth or kieselguhr has been calcined for various purposes, such as for removal of peat, or excessive amounts of organic matter, or for sintering the material, as in making brick. My invention differs from such operations in that the calcination is not at sufficiently high temperature to cause any considerable sintering or binding, and the removal of organic material, in so far as it takes place, is incidental, the material being in its original state comparatively free from organic material.

The material produced as above described is suitable for various uses besides as a filter-aid or filtering agent in filtration processes and on account of its adsorptive properties is of a special value as a dehydrating or demulsifying agent for various emulsions such as those of petroleum or other oils.

What I claim is:

1. The method of producing a material adapted for use as a filter-aid and adsorptive agent, which consists in heating finely divided fresh diatomaceous earth to a sufficiently high temperature to increase its effectiveness as a filter-aid and adsorptive agent.

2. The method of producing a material adapted for use as a filtering and adsorptive agent, which consists in calcining powdered or finely divided diatomaceous earth.

3. The method of producing a material adapted for use as a filtering and adsorptive agent which consists in calcining a powdered or finely divided diatomaceous earth and reducing the calcined material to a state of fine division.

4. The method of producing a material adapted for use as a filtering and adsorptive agent which consists in calcining powdered or finely divided diatomaceous earth at a temperature above 1200° F. and below that at which any considerable sintering of the diatomaceous earth takes place.

5. The method of producing a filtering and adsorptive agent which consists in calcining powdered or finely divided diatomaceous earth at a temperature from 1200° F. to 2500° F.

6. A method as set forth in claim 5 and comprising in addition subjecting the calcined material to disintegrating operation.

7. A material adapted for use as a filter-aid and adsorptive agent consisting of finely divided fresh diatomaceous earth calcined.

8. The herein described method of producing a material adapted for use as a filter-aid and adsorptive agent, consisting in finely dividing diatomaceous earth and then heating same to a sufficiently high temperature to change its physical structure.

9. The herein described method for producing a material adapted for use as a filter-aid and adsorptive agent consisting in finely dividing diatomaceous earth, then heating same to a sufficiently high temperature to change its physical structure and then subjecting the material to a disintegrating operation to reduce it to a finely divided condition.

10. The herein described material adapted for use as a filter-aid and adsorptive agent, consisting of the product produced by heating finely divided diatomaceous earth to a sufficiently high temperature to change its physical structure.

11. The herein described material adapted for use as a filter-aid and adsorptive agent consisting of a product produced by heating a finely divided diatomaceous earth to a sufficiently high temperature to change its physical structure, said product being in disintegrated and finely divided condition.

12. The herein described process consisting in first finely reducing fresh diatomaceous earth, and then calcining it.

13. The herein described process consisting in first finely reducing diatomaceous earth, calcining it, and then subjecting said material to disintegrating operation.

14. The herein described process of treating diatomaceous earth for a filter medium and adsorptive agent, consisting in finely reducing the diatomaceous earth, and then calcining it at a temperature sufficient to produce an increase in filtration capacity.

15. The herein described process of treating diatomaceous earth for a filtering medium or filter-aid consisting in finely reducing the diatomaceous earth, calcining it at a temperature sufficient to produce an increase in filtration capacity and then finally reducing the calcined product to a state of fine division.

16. As an article of manufacture, a diatomaceous earth material consisting of the product produced by finely dividing diatomaceous earth, then calcining, and then subjecting the calcined product to disintegrating operation to reduce it to a state of fine division.

17. The method of producing a material adapted for use as a filtering and adsorptive agent, which consists in calcining powdered or finely divided diatomaceous earth at a temperature of about 1800° F.

18. The method of producing a filtering and adsorptive agent which consists in calcining powdered or finely divided diatomaceous earth at a temperature above 1200° F. and below that at which any considerable sintering of the diatomaceous earth takes place.

19. The herein described method of producing a material adapted for use as a filter-aid, consisting in finely dividing diatomaceous earth and then heating same to a sufficiently high temperature to change its physical structure.

20. The herein described material adapted for use as a filter-aid, consisting of the product produced by heating finely divided diatomaceous earth to a sufficiently high temperature to change its physical structure.

21. The herein described process of treating diatomaceous earth for a filter medium consisting in finely reducing the diatomaceous earth, and then calcining it at a temperature sufficient to produce an increase in filtration capacity.

22. As an article of manufacture, a diatomaceous earth material consisting of the product produced by finely dividing diatomaceous earth and then calcining it.

In testimony whereof I have hereunto subscribed my name this 30th day of July, 1923.

HARRY S. THATCHER.